Sept. 14, 1926.  1,599,626
S. G. WINGQUIST
HYDRAULIC COUPLING AND CHANGE SPEED GEAR
Filed Sept. 16, 1922   2 Sheets-Sheet 1
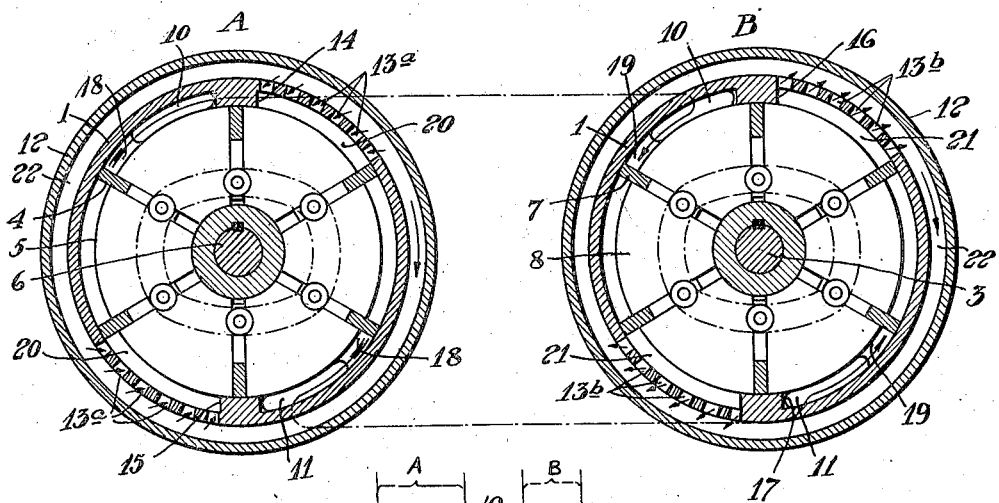
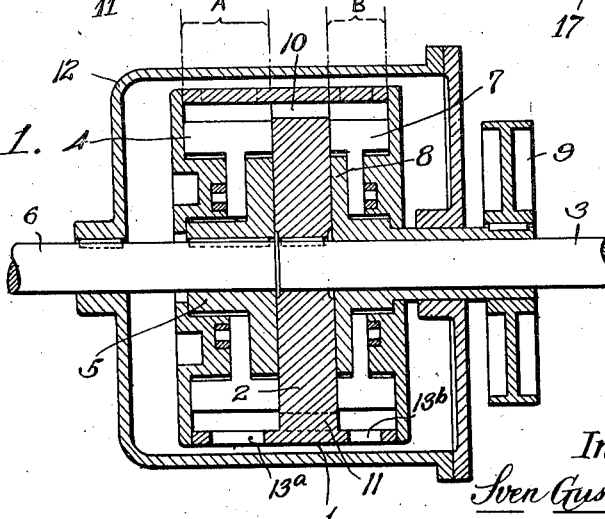
Inventor:
Sven Gustaf Wingquist,
By his Attorneys, Patented Sept. 14, 1926.

1,599,626

UNITED STATES PATENT OFFICE.

SVEN GUSTAF WINGQUIST, OF GOTTENBORG, SWEDEN.

HYDRAULIC COUPLING AND CHANGE SPEED GEAR.

Application filed September 16, 1922, Serial No. 588,657, and in Sweden November 15, 1921.

This invention relates to hydraulic couplings and change speed gears acting according to the differential principle, and consists of a rotor serving as a casing and forming together with a second rotor and a stator, both placed within such casing, two sliding vane pump devices which by their relative volumetric capacities determine the speed ratio of the gear.

One form of change speed gear of this character is fully described and claimed in my United States Patent, No. 1,503,618, granted August 5, 1924. In my co-pending application the rotor common to all of the sliding vane pump devices may in such a change speed gear be connected to a driving shaft, such as the engine shaft of an automobile, and thus constitutes the driving rotor of the gear, while the rotor placed within in the said casing may be connected to a driven shaft, for example, the propeller shaft of an automobile, and thus forms the driven rotor of the gear. In setting such transmission gear for any given speed reduction, i. e. in coupling in one or more stator pump elements with one or more of the driven rotor pump elements, a pressure will arise in all such coupled pump elements, said pressure being transmitted from the driving rotor through the fluid to the driven rotor. In said construction a greater pressure will arise in the sliding vane pump devices as the load resistance moment against the transmission increases. The coupling in of the stator pump elements to secure a more favorable transmission ratio to offset the increased load moment does not in any way tend to reduce the increased fluid pressure, which consequently builds up in exact proportion to the resistance moment, often exceeding a proper working pressure.

The condition of pumps of the sliding vane type, being required to handle fluid under high pressure, is very disadvantageous because of the difficulty of preventing leakage over the areas of sliding contact and of effectively packing the bearings. Furthermore, in hydraulic transmissions employing any type of pump, the flow of fluid under high pressure results in excessive heating, which is wasteful of power and undesirable for many other obvious reasons.

The object of the present invention is to avoid the foregoing drawbacks. According to this invention, the casing forming the common rotor is connected to a driven shaft and forms the driven rotor of the gear, while the rotor provided within the casing is connected to a driving shaft and forms the driving rotor of the gear. In this case an increase of the load-carrying vane surface is effected in coupling in one or more stator elements when establishing a higher gear ratio, thereby in a large measure compensating for an increasing load moment on the driven shaft, with its consequent tendency to increase the fluid pressure. Because of this unique, highly advantageous factor of increased load-carrying vane area when the transmission is set for greater speed reductions there is maintained at all times a comparatively low specific fluid pressure in the present transmission.

The invention contemplates, further, obtaining an ideal cooling of the fluid medium by means hereinafter fully described.

In the drawings annexed hereto, one embodiment of a hydraulic coupling and change speed gear according to the present invention, is shown.

Figure 1 is a vertical axial section of the transmission. Fig. 2 is a combined transverse sectional view of both pump devices showing the paths of travel of the pump fluid.

Figure 3:
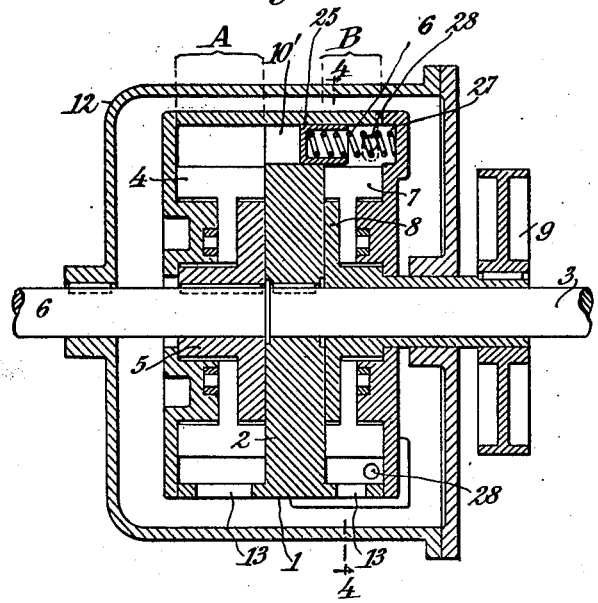
Fig. 3 is a vertical axial section of the type of transmission shown in Figure 1 illustrating one type of valve suitable for use in such transmission, and which valve forms the subject-matter of my aforesaid United States Patent No. 1,503,618.
Figure 4:
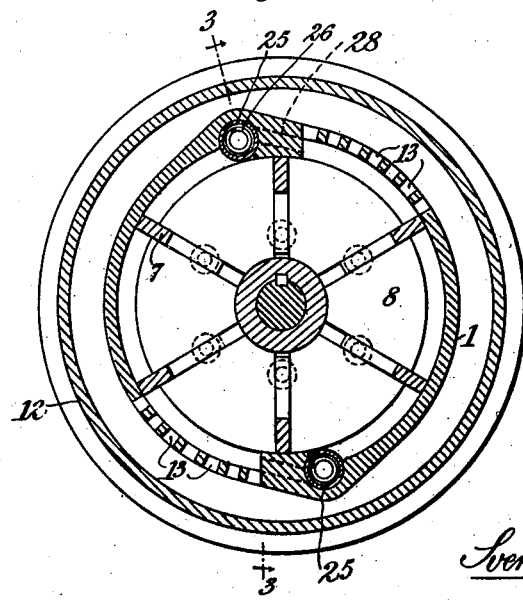
Fig. 4 is a transverse cross-section of the transmission shown in Fig. 3 taken along the line IV—IV.

The device shown in the drawings is designed for direct drive and one speed reduction only, this being sufficient for an adequate disclosure of the invention. Such embodiment consists of two sliding vane pump devices, A and B. Numeral 1 designates the driven rotor common to both pump devices constituting the active external element which by its co-operation with the pump vanes 4 and 7 causes the pumping action of the aforementioned pump devices. This driven rotor is rigidly secured by the partition 2 to a driven shaft 3. Provided within the casing 1 is a rotor 5 carrying the radially-movable vanes 4, and which, according to the present invention, constitutes the driving rotor, being connected to the driving shaft 6. In the casing 1 is further provided a stator 8 carrying radially-movable vanes 7, and which, while the device is acting as a speed-reducing gear, is prevented from rotating by means of a check device 9 mounted on a sleeve extension of the stator 8. The stator check device 9 may be controlled in any known manner, it being required simply to run free while in direct drive, and to resist rotation when the stator pump B is in use for a speed reduction an automatic ratchet device particularly designed for this purpose is described in my United States Patent No. 1,510,368, granted September 30, 1924. Provided in the partition 2 between the pump devices A and B are driving fluid pressure conduits 10 and 11 which may be provided with manually-actuated or automatic valve devices, so that the pump A may be coupled in and uncoupled as required, to effect a transmission ratio change. In Figs. 3 and 4 an automatic pressure-actuated valve is shown as interposed between the two pumps. This automatic valve forms the subject-matter of my United States Patent No. 1,503,618 previously referred to and will hereinafter be more fully described.

According the present invention, rotors 1 and 5 form together the vane pump device A acting as a fluid delivery pump, while the rotor 1 and the stator 8 form together the vane pump device B acting as a receiving pump.

Surrounding the common rotor 1 is a housing 12 closed on all sides, and which, in the embodiment shown, is keyed to the driving shaft 6. The interior of such housing is in communication through openings 13$^a$ and 13$^b$ in the rotor body 1 with the idle suction chambers 20 and 21 of the vane pump devices A and B, i. e., the space on the side of each vane in which the fluid medium is not subjected to the driving pressure and will thus form an outer, idle fluid reservoir 22 common to both the pump devices, and in which the driving fluid will be very effectively cooled by its wide distribution over the entire internal housing area. The housing 12 above referred to may obviously, if desired, be connected to the driven shaft 3, or may be made stationary instead of being fastened to driving shaft 6, without materially altering its function of cooling the contained oil.

In Figs. 3 and 4 an automatic pressure-actuated valve device is illustrated, such valve being adapted to shift the transmission from direct drive to intermediate speed or vice versa automatically and in accordance with the load to which the transmission is at any time subjected. If the transmission pumps are of the duplex or bi-polar type, i. e., having two abutments, two valves are preferably employed, as shown in the figures. As in such case the valves may be identical, only one of them will be described. The valve comprises a hollow piston member 25 which slides freely in a cylindrical bore 10′ in the driven rotor 1. The valve in one position cuts off communication between the delivery pump A and the receiving pump B, as shown in Fig. 3. In another position the valve is moved by fluid pressure from pump A against the force of spring 26, to a position sufficiently to the right of the one illustrated to permit fluid to flow from pump A to pump B. As the valve 25 moves to the right, thereby establishing communication between the two pumps, a by-pass channel 28 which provides a communication between the pressure and suction chambers of the receiving pump B when the transmission is in direct drive, is cut off by the cylindrical wall of the valve 25. When the transmission is in direct drive with the valve closing the connection 10′ between the pumps, the said by-pass 28 is open, so that the receiving pump or motor B cannot, under any circumstances, be operative to produce a circulation between itself and the pump A. That is to say, even though the stator checking device 9 be not released to permit the stator to rotate idly with the driven rotor, no effective pressure will be built up in the pump B due to relative rotation of its elements occasioned thereby, because at such times fluid will idly pass through port 28 from the pressure to the suction chambers of such pump.

As hereinbefore stated, the above described valve mechanism is covered by my United States Patent No. 1,503,618, and is here described merely as illustrative of a form of valve suitable to control the flow of fluid between the two pumps whereby transitions from intermediate speed to direct drive, or vice versa, may be effected. Obviously, any other means for establishing or cutting off the circulation of fluid between the two pumps may be employed.

By shutting off the communications 10, 11, between the two pump devices, a direct drive is effected between the shafts 6 and 3. there being no possible movement of the fluid thus trapped in the delivery pump, while by opening the said communications a transmission ratio is obtained which is dependent on the relative volumetric capacities of the pump devices. However, upon an increase in load on the shaft 3, and the consequent necessity of coupling in the receiving pump element B, a relatively small increase in fluid pressure takes place in the connected pump devices, due to such increased load, because the fluid pressure effective in rotating the driven rotor is, simultaneously with the increase in load, applied to a greatly increased abutment area.

This is true because in the present invention the fluid pressure acts on the abutments 14, 15 and 16, 17 respectively of both pumps A and B in the same direction, and these abutments being commonly mounted on the driven rotor 1, commonly cause said rotor to revolve, each abutment sharing a proportionate part of the load. It is because of this distribution of the load that the specific fluid pressure required to produce a given torque in the present transmission is very much lower than the fluid pressure developed in the same size transmission of the previously mentioned type at the same speed reduction under similar conditions.

In the previously mentioned transmission the fluid pressure effective in producing torque in the driven rotor is applied solely to the vanes of the pump A, the fluid pressure which acts on the stator vanes or on the abutments of the stator pump B in no way contributing to the torque delivered by the transmission. For this reason a transmission of the previously mentioned type requires a much higher specific fluid pressure, for a given torque, at a given speed reduction, than does a transmission operating according to the present invention.

The useful torque-producing pressure, as already stated, is applied in the former type solely to the vanes of one pump (pump A), while in the latter this pressure is applied to abutment surfaces corresponding in effective area to the total combined areas of the vanes of both pumps A and B.

In the operation of the device, let us suppose the direction of rotation of the driving rotor 5 and, thus, also of the driven rotor 1 to be that indicated by the arrows in Fig. 2, pressure chambers will be formed at 18 in the pump A and, if the communications 10 and 11 be open, pressure chambers will also be formed at 19 in the pump B, and consequently, suction chambers will be formed at 20 and 21, respectively, at the opposite sides of the abutments 14, 15 and 16, 17 respectively. By means of sets of openings 13ª and 13ᵇ in the rotor or casing 1 said suction chambers communicate with the annular chamber or space 22 between the common driven rotor 1 and the surrounding housing 12, said chamber 22, thus, forming a common suction chamber for the two pumps A and B.

Supposing now the driving rotor 5 with its vanes 4 to be rotated in the aforesaid direction and supposing, further, the channels 10 and 11 between the pressure chambers 18 and 19 of the two pumps to be shut off, the common rotor 1 will be driven in the same direction and with the same speed as the driving rotor 5, since the fluid will in this case be entirely trapped within the chambers 18 of the pump A between the abutments 14, 15 and the adjacent vanes 4. In this case the stator 8 with its vanes 7 is to be released, so as to rotate freely with the rotors 1 and 5.

If, then, the communications 10 and 11 between the two pumps be opened, the pump A will act as a delivery pump forcing the fluid under pressure to the chambers 19 of the pump B, which will, thus, act as a receiving pump. The stator 8 is in this case to be checked, and, consequently, a pressure will arise also in the chambers 19 of the receiving pump B, said pressure affording a reaction force on the abutments 16 and 17. The fluid delivered from the pump A to the pump B escapes through the openings 13ᵇ to the common chamber 22 and from there through the openings 13ª to the suction chambers 20 of the pump A, a circulation of the fluid thus taking place between the two pumps. The driven rotor 1 will thereby obtain a slip with relation to the driving rotor 5 corresponding to the ratio between the volumetric capacities of the two pumps and its torque will be increased correspondingly, due to the reaction force of the fluid pressure on the abutments 16 and 17.

It is obvious that the number of pump stages or the relative volumes of the pumps may be varied to obtain other transmission ratios than those described, without departing from the spirit of the invention.

I claim:

1. A hydraulic coupling and change speed gear comprising a driving rotor, a driven rotor, and a stator, said driving rotor and driven rotor forming together a rotary pump device, said stator and driven rotor forming together a second rotary pump device, conduits connecting said pump devices, and means adapted to control the circulation of fluid between the pumps whereby either direct drive or the speed ratio determined by the fixed capacities of the two connected pump devices, may be obtained.

2. A hydraulic coupling and change speed gear comprising a driving rotor, a driven rotor, and a stator, the driving rotor and the driven rotor forming together a rotary pump device, the driven rotor and stator forming together a second rotary pump device, the driven rotor being common to both pump devices, pressure channels connecting both pump devices, means to control the flow of fluid between said pump devices, and a housing surrounding said pump devices and being in open communication with the idle fluid chambers of said pump devices.

3. A hydraulic coupling and change speed gear comprising a driving rotor, a driven rotor, and a stator, the driving rotor and the driven rotor forming together a vane pump device, the driven rotor and stator forming together a second vane pump device, the driven rotor being common to both pump devices, a pressure channel connecting both pump devices, valve means to open and close said channel, and a housing surrounding said pump devices and being in open communication with the idle fluid chambers of said pump devices.

4. A hydraulic coupling and change speed gear comprising a driving rotor, a driven rotor, and a stator, the driving rotor and the driven rotor forming together a vane pump device, the driven rotor and stator forming together a second vane pump device, the driven rotor being common to both pump devices, pressure channels connecting both pump devices, a housing surrounding said pump devices and being in open communication with the idle fluid chambers thereof, said housing being rotatable with respect to the driven rotor.

5. A hydraulic coupling and change speed gear comprising a driving rotor, a driven rotor and a stator, the driving rotor and the driven rotor forming together a vane pump device, the driven rotor and stator forming together a second vane pump device, the driven rotor being common to both pump devices, pressure channels connecting both pump devices, a housing surrounding said pump devices and being in open communication with the idle fluid chambers thereof, said housing being connected to the driving rotor.

In testimony whereof I have signed my name.

SVEN GUSTAF WINGQUIST.